Aug. 14, 1951     R. W. SILER     2,564,036
ROPE CLAMP
Filed March 21, 1949     5 Sheets-Sheet 3
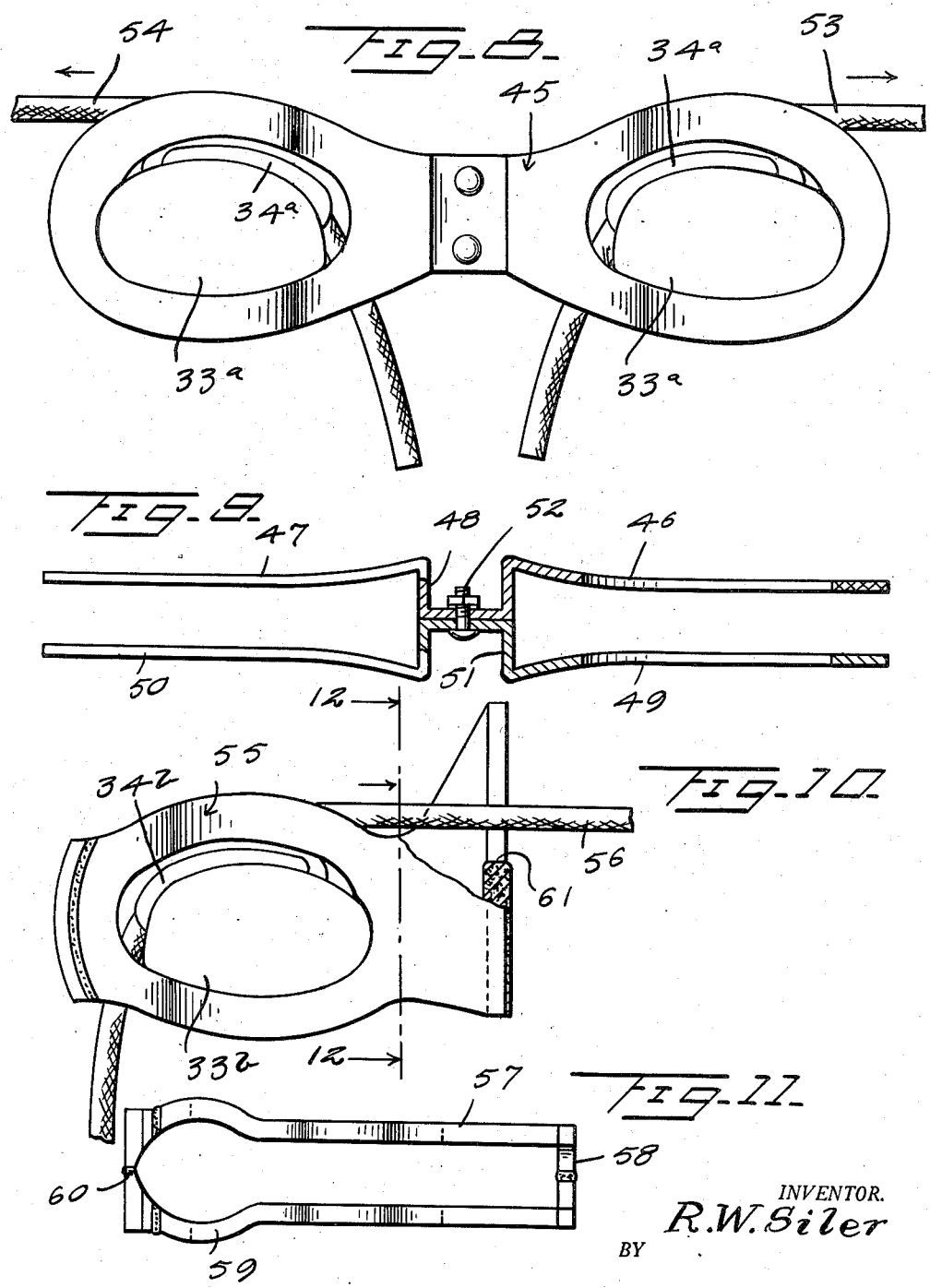
INVENTOR.
R. W. Siler
BY
Kimmel & Crowell Attys.

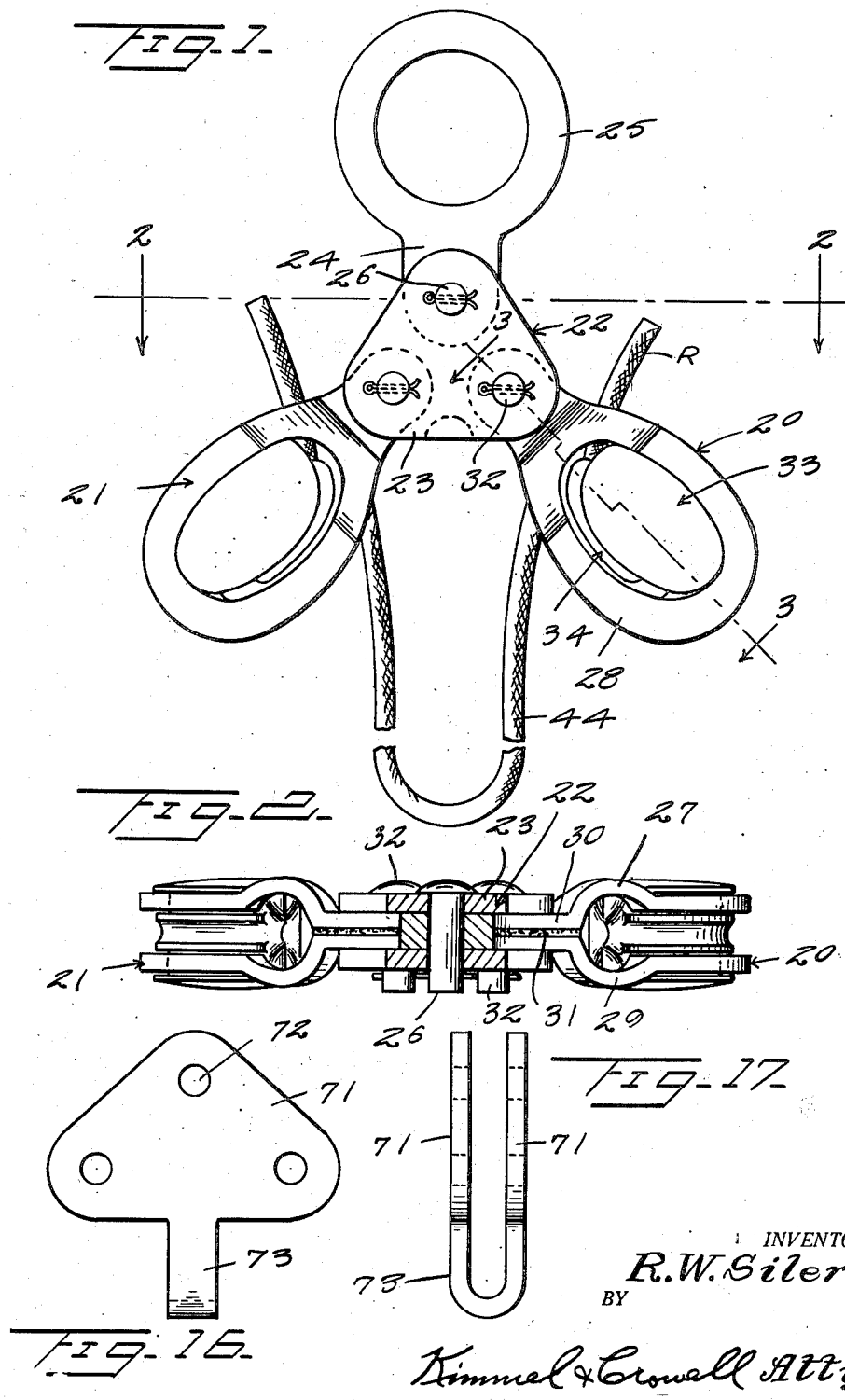

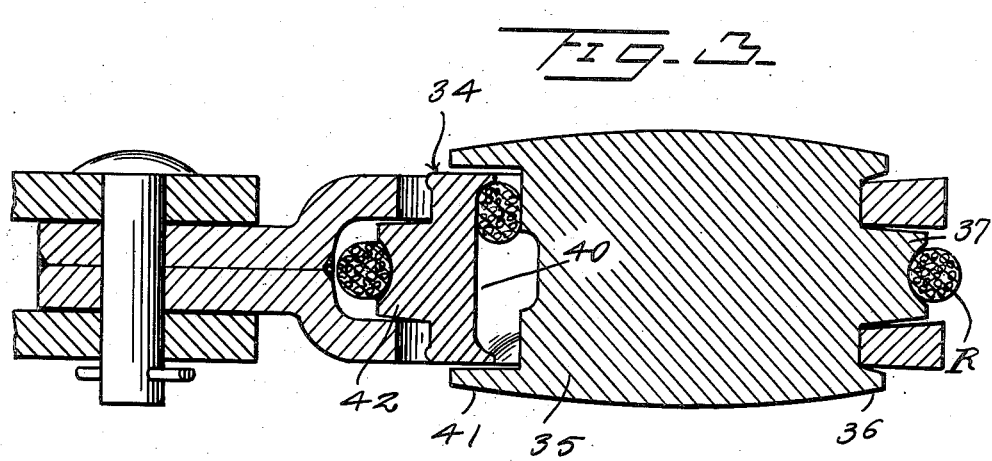
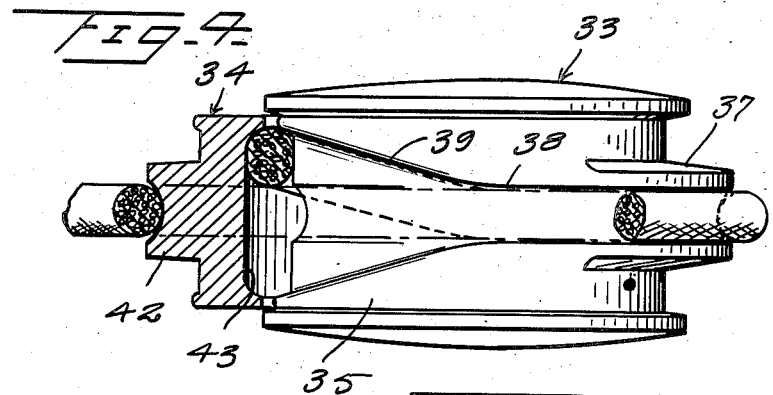
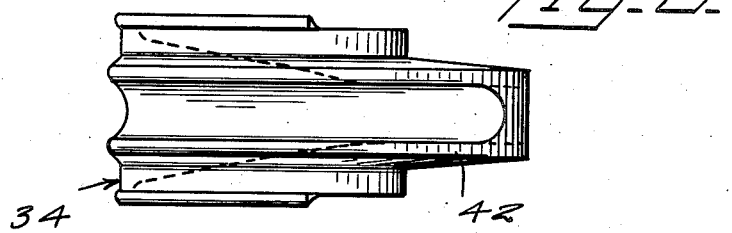
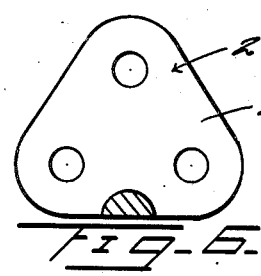
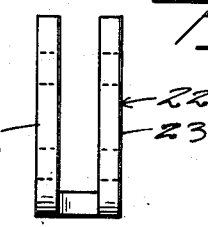

Aug. 14, 1951
R. W. SILER
2,564,036
ROPE CLAMP
Filed March 21, 1949
5 Sheets-Sheet 4
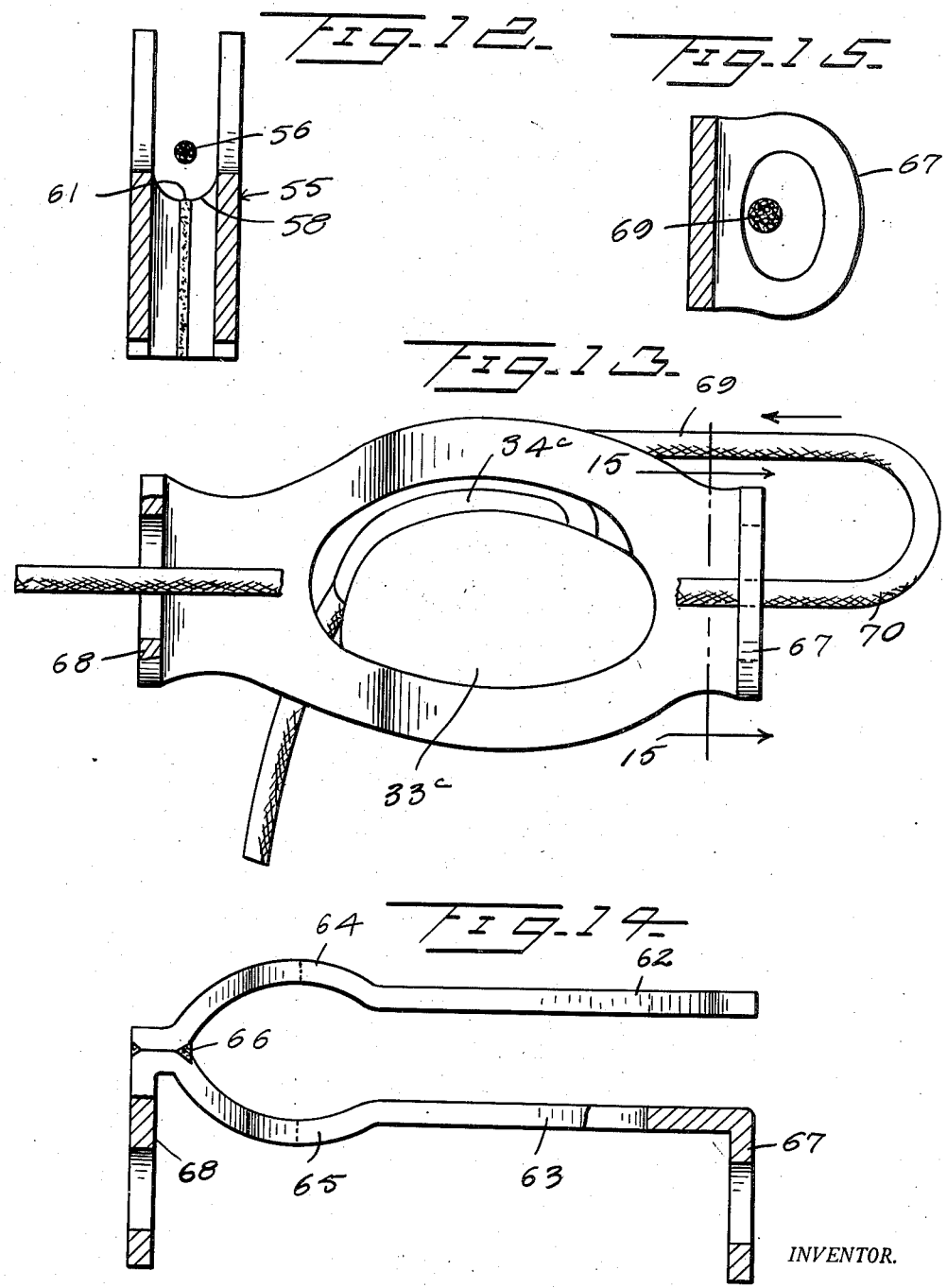
INVENTOR.
BY R. W. Siler
Kimmel & Crowell Attys.

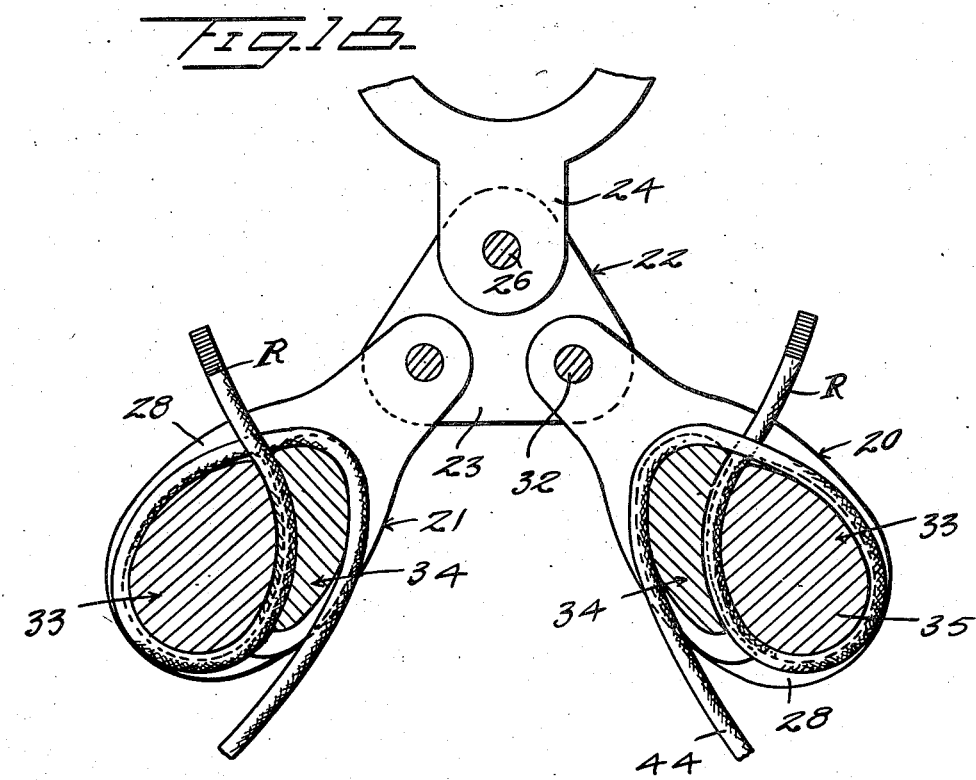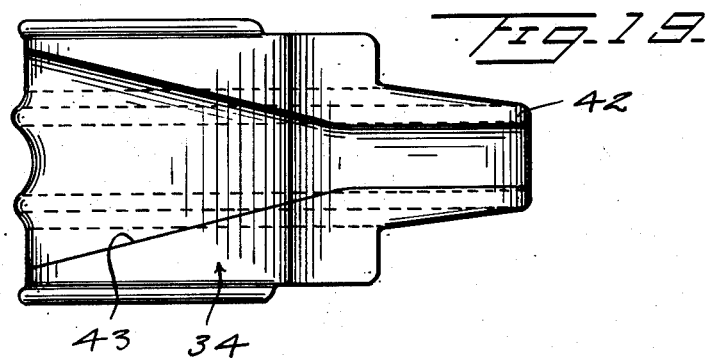

Patented Aug. 14, 1951

2,564,036

UNITED STATES PATENT OFFICE 2,564,036

ROPE CLAMP

Robert W. Siler, Williamsburg, Ky., assignor to Siler Sling Corp., Hazard, Ky.

Application March 21, 1949, Serial No. 82,534

4 Claims. (Cl. 24—126)

This invention relates to an improved rope clamp and is an improvement over the construction embodied in my Patent No. 2,515,571, dated July 18, 1950, filed November 15, 1948, for improved Sling Clamp.

An object of this invention is to provide a clamp for a rope, which may be formed of either wire or fibers, which will tightly grip the rope with the gripping force increasing in proportion to the pull exerted on the rope.

A further important object of the invention resides in the provision of a double wedge type rope clamp of the type disclosed in my above mentioned patent wherein the interior grooves of the coacting wedges are provided with flared portions at their point of closest engagement whereby the loop of the rope extending between the wedges may be passed by the loop surrounding the same to provide a readily adjustable sling.

Another object of this invention is to provide a clamp assembly including a pair of clamp frames with each frame having a pair of wedges, and a connector secured between the frames.

A further object of this invention is to provide a clamp structure which may be used either singly or in pairs wherein the wedge frame may be stamped from sheet metal and the frame pieces either bolted, welded or otherwise secured together.

In one embodiment of this invention one of the frame members is provided with a pair of aligned eyes through which the rope is extended from the wedges so as to provide a loop in the rope which will be tightened in proportion to the pull on the rope.

In another embodiment of this invention a single piece of rope may be formed into a sling or loop of fixed length by means of a pair of clamps secured to a connector with an eye secured to the connector.

In a further embodiment of this invention, a single clamp structure is used as a dead end clamp adapted to bear against a fixed element.

A further object of this invention is to provide an improved connector for use with a pair of sling clamps so that a basket or double sling may be formed and secured to suspension means.

With the above and other objects in view, my invention consists in the arrangement, combination and details of construction disclosed in the drawings and specification, and then more particularly pointed out in the appended claims.

In the drawings,

Figure 1 is a detail side elevation of a rope clamp constructed according to an embodiment of this invention, Figure 2 is a sectional view taken on the line 2—2 of Figure 1, Figure 3 is a fragmentary sectional view taken on the line 3—3 of Figure 1, Figure 4 is a bottom plan or inner side view, partly in section, showing one pair of the wire clamping wedges, Figure 5 is a bottom plan or outer side view of the smaller one of the pair of wedge members, Figure 6 is a detail side elevation of the clevis used in connecting a pair of these clamping devices together, Figure 7 is a detail end elevation of the clevis, Figure 8 is a detail side elevation of a modified form of this invention, Figure 9 is a plan view, partly broken away and in section, of the supporting frame for the wedge members shown in Figure 8, Figure 10 is a detail side elevation, partly broken away, of another modified form of this invention, Figure 11 is a plan view of the frame shown in Figure 10, Figure 12 is a sectional view taken on the line 12—12 of Figure 11, Figure 13 is a detail side elevation of another modified form of this invention, Figure 14 is a plan view, partly broken away and in section, of the frame shown in Figure 13, Figure 15 is a sectional view taken on the line 15—15 of Figure 13, Figure 16 is a detail side elevation of another form of clevis, Figure 17 is a detail end elevation of the clevis shown in Figure 16, Figure 18 is a view similar to Figure 1, partly in elevation and partly in section showing the path of travel of the rope, Figure 19 is an inner side view of the crescent shaped wedge.

Referring to the drawings and first to Figures 1 to 7 inclusive, the numerals 20 and 21 designate generally a pair of rope clamping members which are secured in downwardly divergent relation to a clevis 22. The clevis 22 is of triangular configuration in side elevation and has mounted between the triangular sides 23 thereof the shank 24 carried by a ring 25.

The shank 24 is mounted on a pivot pin 26 engaging through the sides 23 so that the clevis 22 may rock relative to the shank 24 and the suspension means which is connected with the ring or eye 25. The two clamping members 20 and 21 are of like construction and each includes a frame generally designated as 27. The frame 27 is formed of a pair of substantially elliptical members 28 forming supports for the wedges to be hereinafter described, and the loops 28 include offset inner portions 29, and shanks 30, extending from the offset portions 29.

The shanks 30 are adapted to be welded or otherwise firmly secured together as indicated at 31, and a pivot pin 32 is extended through the connected together shanks 30 and through the sides 23 of the clevis 22.

The frame 20 has loosely mounted within the elongated rings or loops 28 thereof a pair of wire clamping wedge members generally designated as 33 and 34. The wedge member 33 is the larger one of these wedges and includes a substantially elliptical body 35 which is formed on the opposite sides thereof with flanges 36 within which the loop members 28 are adapted to loosely engage. The body 35 is formed with a grooved and longitudinally curved rib 37 extending from substantially the outer portion of the body 35, about the outer side of the body 35. The body 35 also includes a groove 38 merging with the grooved rib 37, and the groove 38 is formed with a flared grooved portion 39, the purpose for which will be hereinafter described.

The rib 37, as shown in Figure 4, engages between the loops or rings 28 and coacts with the flanges 36 in holding the body 35 within the two rings or loops 28. The second and smaller wedge 34 is formed with a concave inner side 40, engaging about the body 35, and the body 35 is provided with relatively wide flanges 41 constituting extensions of the flanges 36 and between which the small wedge member 34 is adapted to loosely engage. The wedge member 34 is formed with a grooved rib 42 which is adapted to be positioned in alignment with the rib 37 so that the rope R may be wrapped about the two wedge members 33 and 34, and be extended between the two wedge members, engaging in the flared groove 39 of the body 35 to guide the rope to an end position in the complementary flared groove 43 which is formed in the small wedge member 34, in which the ropes also engage.

The end of rope R is extended between the small wedge 34 and eye frames at the lug or inner end. The rope is then wrapped clockwise about the larger wedge member 33, being positioned in the groove of rib 37 and is then brought downwardly and extended upwardly between the two wedges 33 and 34, the free end projecting upwardly as shown in Figure 1. The flared grooves 39 and 43 permit the free end of the rope to be shifted laterally so that the looped and binding portion of the rope may be positioned within the grooves of the two wedge members 33 and 34. As strain is applied to the extended portion 44 of the rope, the strain will move small wedge member 34 downwardly and outwardly to a tight wedging position against the larger wedge member 33. By having the two clamping devices 20 and 21, a single length of rope may be engaged with the two clamping devices and the rope extended downwardly in a loop for forming a sling.

Referring now to Figure 8 there is disclosed a modified form of this invention, which is designed particularly for use in connecting the ends of a clothesline or other fibrous rope or wire. A frame structure generally designated as 45 has two pairs of wedge members 33a and 34a mounted therein, which are identical with the wedge members 33 and 34. The frame structure 45 includes a pair of oppositely extending elongated loop members 46 and 47 which are connected together by means of a U-shaped connecting member 48 integral with the loop members 47 and 46. A second pair of loop members 49 and 50 are disposed in confronting position with respect to the loop members 46 and 47 respectively, and the loop members 49 and 50 are connected together by means of a U-shaped connecting member 51. The two U-shaped members 48 and 51 are secured together by fastening means 52 which in the present instance is shown as a pair of bolts or screws, although it will be understood that if desired the connecting members 48 and 51 may be secured together by welding or the like.

In the use of the clamping structure shown in Figure 8, the two rope members 53 and 54 are extended about and between the wedge members 33a and 34a, with the free ends of the ropes extended downwardly, as shown in Figure 8. As tension is applied to the ropes 53 and 54, the wedge members 34a will be drawn to clamping position with respect to the large wedge members 33a. The rope will be tightly clamped in proportion to the pull or strain which is applied thereto.

Referring now to Figures 10 and 11, there is disclosed another modification of this invention, embodying a looped frame structure generally designated as 55, with which one end of a rope 56 is adapted to be connected. The frame structure 55 includes a pair of loop members 57 connected together at their outer ends by a connecting bar or plate 58, and the loops 57 are formed with offset longitudinally curved shanks 59 which are secured to a base plate 60 having an upwardly opening slot 61 therein through which the rope 56 is adapted to be extended. The plate 60 forms the base for the end clamping structure shown in Figures 10 and 11 and if desired may be secured by any suitable fastening means to a support. The two loops 57 of the frame 55 have mounted therein a pair of wedge members 33b and 34b which are identical with the wedge members 33 and 34. As shown in Figure 10, the rope 56 has one end thereof extended through the slot 61, extended counterclockwise over the small wedge member 34b and large wedge 33b and finally passed between the wedges and the free end dropped downwardly.

Referring now to Figures 12 to 15 inclusive, there is disclosed another modification of the invention designed for use in providing a slip loop on a rope. A pair of looped frame members 62 and 63 formed with opposed arcuate end portions 64 and 65 respectively are secured together by fastening means 66. The loop members 62 and 63 have mounted therein rope clamping wedge members 33c and 34c identical with the wedge members 33 and 34, and the frame member 63 is formed at one end thereof with an eye 67 extending at right angles to the length of the frame member 63.

A second eye or guide ring 68 is formed at the opposite end of the frame member 63 in substantial alignment with the eye or guide member 67. As shown in Figure 13, the free end of the rope 69 is extended initially through guides 68 and 67, over the outer groove of small wedge 34c, being passed about the large wedge member 33c and then between the wedge members 33c and 34c. A contracting loop 70 will be formed in the rope which will be contracted according to the strain or pull applied to the rope 69 at the end thereof opposite from the clamping structure herein disclosed.

The clamping structure shown in Figures 13 and 14 provides a slip loop which may be mounted at any point along the length of the rope and a contracting loop formed in the rope at a desired point without cutting the rope or forming knots or the like in the rope.

Referring now to Figures 16 and 17, there is disclosed a modified form of clevis embodying a pair of triangular plates 71 having openings 72 which in the present instance are three in number so that if desired three clamping devices may be secured to the clevis or if desired a ring or other element may be mounted in the apex of one of the openings 72. The two plates 71 are connected together by a U-shaped connecting member 73 which may be engaged by a hook or ring. The clevis shown in Figures 16 and 17 is shown in an inverted position.

I do not mean to confine myself to the exact details of construction herein disclosed, but claim all variations falling within the purview of the appended claims.

What I claim is:

1. A rope clamp comprising a frame formed of a pair of connected together frame members having coaxial elliptical openings, a pair of wedge members loosely mounted in said openings, one of said wedge members being of substantially elliptical configuration in side elevation, a pair of outer flanges carried by said one wedge member engaging on the outer sides of said pair of frame members, a fragmentary longitudinal rib carried by said one wedge member engaging between said frame members, said rib having a groove on the outer side thereof, said one wedge member having a groove aligning with the groove of said rib, the end of said last mentioned groove adjacent said rib between said flanges having a flared portion, said other wedge member being of elongated configuration having a convex outer side and a concave inner side, said inner side having a groove confronting the groove of said one wedge member, a grooved rib carried by said other wedge member engaging between said pair of frame members, said last mentioned groove being flared at one end adjacent said first mentioned flared portion, the rope being initially extended over the outer groove of the other of said wedge members, over the grooved rib of said one wedge member, and then extended between said wedge members.

2. A rope clamp comprising a frame formed of a pair of substantially elliptical frame members formed with elliptical openings, means securing said frame members together at one small end thereof, a substantially elliptical wedge member movably disposed between said frame members, a second wedge of partly crescent shape disposed between said frame members with the concave edge thereof confronting the convex edge of said elliptical wedge member, said wedge members having grooves about the edges thereof within which the rope is adapted to engage, the confronting portions of the grooves of said members being flared for a portion of the confronting lengths thereof, the flared portions of said grooves extending from a point inwardly of one end of said concave edge to an end of said concave edge.

3. A rope clamp comprising a frame formed of a pair of substantially elliptical frame members formed with elliptical openings, means securing said frame members together at one small end thereof, a substantially elliptical wedge member movably disposed between said frame members, a second wedge of partly crescent shape disposed between said frame members with the concave edge thereof confronting the convex edge of said elliptical wedge member, said wedge members having grooves about the edges thereof within which the rope is adapted to engage, and a pair of laterally extending eyes carried by one of said frame members, the confronting portions of the grooves of said members being flared for a portion of the confronting lengths thereof, the flared portions of said grooves extending from a point inwardly of one end of said concave edge to an end of said concave edge.

4. A rope clamp comprising a frame formed of a pair of substantially elliptical frame members formed with elliptical openings, means securing said frame members together at one small end thereof, a substantially elliptical wedge member movably disposed between said frame members, a second wedge of partly crescent shape disposed between said frame members with the concave edge thereof confronting the convex edge of said elliptical wedge member, said wedge members having grooves about the edges thereof within which the rope is adapted to engage, and a slotted base carried by the opposite ends of said frame members, the confronting portions of the grooves of said members being flared for a portion of the confronting lengths thereof, the flared portions of said grooves extending from a point inwardly of one end of said concave edge to an end of said concave edge.

ROBERT W. SILER.

REFERENCES CITED

The following references are of record in the file of this patent:

UNITED STATES PATENTS

| Number | Name | Date |
| --- | --- | --- |
| 1,379,311 | Page | May 24, 1921 |
| 1,758,312 | De Right | May 13, 1930 |
| 2,384,497 | Siler | Sept. 11, 1945 |